US011441972B2

(12) United States Patent
Korzuschnik

(10) Patent No.: US 11,441,972 B2
(45) Date of Patent: Sep. 13, 2022

(54) RECEPTACLE DEVICE FOR RECEIVING A DRIVE AXLE OF A MOTOR VEHICLE FOR A TEST BENCH

(71) Applicant: Siemens Aktiengesellschaft, Munich (DE)

(72) Inventor: Michael Korzuschnik, Hetzles (DE)

(73) Assignee: Siemens Aktiengesellschaft, Munich (DE)

( * ) Notice: Subject to any disclaimer, the term of this patent is extended or adjusted under 35 U.S.C. 154(b) by 230 days.

(21) Appl. No.: 16/634,499

(22) PCT Filed: Jul. 25, 2018

(86) PCT No.: PCT/EP2018/070127
§ 371 (c)(1),
(2) Date: Jan. 27, 2020

(87) PCT Pub. No.: WO2019/020670
PCT Pub. Date: Jan. 31, 2019

(65) Prior Publication Data
US 2020/0232879 A1   Jul. 23, 2020

(30) Foreign Application Priority Data

Jul. 28, 2017   (EP) .................................. 17183767

(51) Int. Cl.
*G01M 13/027*      (2019.01)
(52) U.S. Cl.
CPC ................................. *G01M 13/027* (2013.01)
(58) Field of Classification Search
CPC ................................................. G01M 13/027
See application file for complete search history.

(56) References Cited

U.S. PATENT DOCUMENTS 3,712,127 A * 1/1973 Petersen ............. G01M 13/025
73/116.04
4,898,026 A * 2/1990 Damitz ............... G01M 13/026
73/115.01
(Continued)

FOREIGN PATENT DOCUMENTS

CN      101542262 A     9/2009
CN      204694462 U     10/2015
(Continued)

OTHER PUBLICATIONS

Zhou Zhaohua et al: "The Design of Electric Vehicle Driving Axle and Fatigue Life Analysis"; Engineering Technology Series II of China Master's Theses Full-text Database; No. 2; 2016.
(Continued)

*Primary Examiner* — Freddie Kirkland, III
(74) *Attorney, Agent, or Firm* — Henry M. Feiereisen LLC

(57) ABSTRACT

The invention relates to a receptacle device (6) for receiving a drive axle (4) of a motor vehicle for a test bench (2). In order to achieve a load distribution that is more realistic in comparison to the prior art, according to the invention the receptacle device (6) has at least one external unit (18) for connection to the test bench (2) and at least one inner unit (20), enclosed at least in part by the outer unit (18), wherein the inner unit (20) is translationally fixed relative to the outer unit (18) and is designed to be flexibly rotatable about at least one axis, and wherein the inner unit (20) has a recess (40) suitable for receiving the drive axle (4).

22 Claims, 4 Drawing Sheets

(56) References Cited

U.S. PATENT DOCUMENTS

| | | | | |
|---|---|---|---|---|
| 5,576,496 | A * | 11/1996 | Carlini | G01M 13/025 |
| | | | | 73/121 |
| 5,760,302 | A * | 6/1998 | Moradi | G01M 1/22 |
| | | | | 73/462 |
| 5,922,952 | A * | 7/1999 | Moradi | G01M 1/24 |
| | | | | 73/462 |
| 6,303,896 | B1 | 10/2001 | Kopp et al. | |
| 6,389,888 | B1 * | 5/2002 | Juranitch | G01M 13/02 |
| | | | | 73/115.06 |
| 7,980,123 | B2 * | 7/2011 | Ussery | F16M 1/04 |
| | | | | 73/116.01 |
| 8,635,904 | B2 * | 1/2014 | Gutsche | G01M 13/026 |
| | | | | 73/116.04 |
| 10,156,496 | B2 * | 12/2018 | Khateri | G01M 17/007 |
| 2007/0223849 | A1 | 9/2007 | Tschopp et al. | |
| 2013/0055804 | A1 | 3/2013 | Preising et al. | |
| 2013/0160537 | A1 | 6/2013 | Preising et al. | |
| 2016/0032548 | A1 | 2/2016 | Braun | |

FOREIGN PATENT DOCUMENTS

| | | |
|---|---|---|
| CN | 105088132 A | 11/2015 |
| CN | 205088663 U | 3/2016 |
| CN | 205898455 U | 1/2017 |
| CN | 206020044 U | 3/2017 |
| CN | 106568600 A | 4/2017 |
| CN | 106769108 A | 5/2017 |
| DE | 3818661 A1 | 12/1988 |
| DE | 102011085611 A1 | 5/2013 |
| DE | 102012101613 A1 | 6/2013 |
| EP | 0293425 B1 | 2/1992 |
| EP | 1837538 A2 | 9/2007 |

OTHER PUBLICATIONS

Bitao, Wu et al.; "Damage identification method for continuous girder bridges based on spatially-distributed long-gauge strain sensing under moving loads"; Mechanical Systems and Signal Processing; vol. 104; 2018.

Chen, Yong et al:; "Research Status and Development Trend on Strengthening Technology of High Strength Automobile Gear Surface"; China SUrface Engineering; vol. 30; No. 1; 2017.

PCT International Examination Report and Written Opinion of International Examination Authority dated Nov. 15, 2018 corresponding to PCT International Application No. PCT/EP2018/070127 filed Jul. 25, 2018.

* cited by examiner

RECEPTACLE DEVICE FOR RECEIVING A DRIVE AXLE OF A MOTOR VEHICLE FOR A TEST BENCH

CROSS-REFERENCES TO RELATED APPLICATIONS

This application is the U.S. National Stage of International Application No. PCT/EP2018/070127, filed Jul. 25, 2018, which designated the United States and has been published as International Publication No, WO 2019/020670 and which claims the priority of European Patent Application, Ser. No, 17183767.7, filed Jul. 28, 2017, pursuant to 35 U.S.C. 119(a)-(d).

BACKGROUND OF THE INVENTION

The invention relates to a test bench for testing a drive axle for a motor vehicle having at least one drive device, at least one loading device and at least one receptacle device.

The invention further relates to a method for testing a drive axle for a motor vehicle on a test bench.

Drive axles of this type are used in particular in passenger vehicles and commercial vehicles. The drive axle is to be installed on a test bench for the purposes of carrying out a test, for example to determine wear or service life. Examinations on such a test bench are more cost-effective and more reliable, since the result depends to a lesser extent on external conditions. Furthermore, tests can be reproduced more easily on the test bench than during a test run in a vehicle. The test bench must be capable of realistically simulating different wheel loads and axle loads, for example. In addition to a static and dynamic loading of the axle, a suspension is also required for a realistic load distribution.

The patent specification EP 0 293 425 B1 discloses a method for testing drive axles for motor vehicles, in which the drive axle, comprising axle housing, axle gear unit and at least one axle shaft, is clamped onto a test bench, driven on the drive side and braked on the output side, wherein during testing of the overall function of the axle, comprising drive and support function, the axle is loaded in the driven state by additional forces unrelated to driving and braking.

The unexamined patent application DE 3 818 661 A1 discloses a test facility for testing complex drive systems, for example driven vehicle axles in which load spectrums generated by a computer are transferred by means of a device directly onto the wheel heads of such vehicle axles. The device comprises controllable actuators for generating horizontal and longitudinal forces as well as pairs of forces. Furthermore, the device is driven by means of an electric simulation drive. The controllable actuators and the electric simulation drive are linked to the computer via a control facility, so that any load spectrum can be generated.

The unexamined patent application DE 10 2012 101 613 A1 discloses a test bench for motor vehicles or axles of motor vehicles for chassis development, on which gyroscopic torques of a rotating wheel can also be simulated. The test bench has a wheel substitute system, which is connected to at least one axle of the motor vehicle and comprises a wheel substitute mass and means for driving the wheel substitute mass. The test bench further has an arrangement for introducing test forces, torques and movements into the motor vehicle or the axles of the motor vehicle in the longitudinal, horizontal and/or height direction, wherein the means for driving the wheel substitute mass are suitable for causing the wheel substitute mass to rotate and the arrangement for introducing test forces, torques and movements is suitable for generating a gyroscopic torque of the wheel substitute mass which has been caused to rotate by introducing test forces, torques and movements into the motor vehicle or the axles of the motor vehicle in the longitudinal, horizontal and/or height direction.

The unexamined patent application EP 1 837 538 A2 discloses a joint bearing having an inner ring and an outer ring, wherein the outer ring has a length and an outer circumference that define a first shoulder, which is arranged at one end along the length, and a second shoulder, which is arranged at a second end along the length, wherein the second end generally lies opposite the first end. The first and the second shoulder are dimensioned such that they press against a housing wall, wherein the housing wall defines a borehole in which the joint bearing is positioned.

The unexamined patent application DE 10 2011 085611 A1 discloses a concept for sealing a bearing component for a bearing, which comprises a fastening option for fastening to a component to be supported, wherein the bearing component or the component to be supported has a recess for a seal, such that the bearing component can be connected at least in a watertight manner to the component to be supported.

The unexamined patent application US 2013/055804 A1 discloses a test bench for the dynamic testing of an individual chassis component or of a complete axle system of a motor vehicle. The test bench comprises a test bench frame. The test bench frame has a mounting area, which is provided for mounting the complete axle system in the mounting area in a first mounting direction. A fastening apparatus is provided for the secure mounting of the individual chassis components on the fastening apparatus in a second mounting direction, wherein the second mounting direction differs from the first mounting direction.

The object underlying the invention is to provide a receptacle device for receiving a drive axle of a motor vehicle for a test bench, with which a more realistic load distribution can be achieved in comparison with the prior art.

SUMMARY OF THE INVENTION

This object is achieved according to the invention by a test bench for testing a drive axle for a motor vehicle having at least one drive device, at least one loading device and at least one such receptacle device, wherein the receptacle device has at least one outer unit for connection to the test bench and at least one inner unit, enclosed at least in part by the outer unit, wherein the inner unit is translationally fixed relative to the outer unit and is designed to be flexibly rotatable about more than one axis, and wherein the inner unit has a recess suitable for receiving the drive axle.

The object is further achieved according to the invention by a method for testing a drive axle for a motor vehicle on a test bench having at least one drive device, at least one loading device and at least one receptacle device, wherein the receptacle device has at least one outer unit for connection to the test bench and at least one inner unit, enclosed at least in part by the outer unit, wherein the inner unit is translationally fixed relative to the outer unit and is arranged to be flexibly rotatable about more than one axis, and wherein the drive axle is received by a recess of the inner unit.

The advantages and preferred embodiments cited below with respect to the receptacle device can be transferred analogously to the test bench and the test method.

The object underlying the Invention Is to specify a receptacle device for a drive axle on a test bench, in which the drive axle is received as realistically as possible with regard to its loading and load distribution. In order to ensure that it is received realistically, the drive axle is received in a secure and stable manner by means of an inner unit, which is in particular affixed to the original suspension points. As a result, the drive axle is received in particular as in the vehicle. The inner unit is enclosed at least in part by an outer unit, wherein the inner unit with the drive axle is translationally fixed relative to the outer unit and is arranged to be flexibly rotatable about more than one axis so that the same degrees of freedom exist as in the vehicle, particularly with regard to an application of force and an application of torque. A realistic load distribution is achieved by the drive axle being received in this way.

In a preferred embodiment, the inner unit has a partially spherical surface. In particular, the inner unit has an equatorially symmetrical, spherical segment-shaped surface. A spherical segment is a part of a full sphere that is cut out with two parallel planes. In an equatorially symmetrical spherical segment, the area of both parallel circular sections is equal in size. The round region of the spherical segment forms a contact surface to the outer unit. The inner unit is three-dimensionally rotatable on account of such a partially spherical surface and is translationally fixed on account of the equatorially symmetrical embodiment.

In a further preferred embodiment, the outer unit has a contact surface corresponding to the partially spherical surface of the inner unit, at least in the region of a contact area. A corresponding contact surface is in particular a partially spherical recess, which corresponds substantially to the inverse of the partially spherical surface of the inner unit. In particular on account of an equatorially symmetrical embodiment of the corresponding contact surface, the inner unit is enclosed in part by the outer unit, wherein the inner unit is translationally fixed and flexibly rotatable relative to the outer unit.

In a further advantageous embodiment, the partially spherical surface of the inner unit and/or the corresponding contact surface of the outer unit are coated, in particular with a coating having molybdenum. At least one of the surfaces is carburized, subsequently manganese-phosphated and coated with a lubricant varnish based on molybdenum disulfide. Alternatively, a molybdenum coating is applied by means of flame spraying to at least one of the surfaces, wherein the molybdenum coating has a very good adhesion on account of its metallurgical properties. The coating thickness of the molybdenum coating lies between 0.1 mm and 2.0 mm. Such a coating optimizes the friction behavior between the inner unit and the outer unit.

Particularly advantageously, the inner unit is configured in at least two parts. On account of a two-part configuration, the drive axle can be mounted easily and quickly.

In a further preferred embodiment, the loading device has wheel hub bearing means, via which a loading machine can be connected to the drive axle. The wheel hub bearing means comprise in particular at least one bearing unit, by way of which the drive axle is connected in a realistic manner to the loading device.

Particularly advantageously, the wheel hub bearing means comprise a bearing unit for absorbing an axial force. The bearing unit is affixed in particular in an axially flexible manner to a wheel hub. Such a bearing unit enables a loading of the drive axle free from axial forces.

In a further advantageous embodiment, the loading device has at least one hydraulic cylinder for loading the drive axle with an in particular dynamic additional force. The dynamic additional force is generated by raising and lowering the hydraulic cylinder and acts in particular radially on the drive axle. Such a dynamic additional force acting radially on the drive axle enables ground unevennesses, for example, to be reproduced on the test bench.

Particularly advantageously, the loading device has push rods for transmitting an in particular dynamic additional force. The push rods make it possible to vary the force direction of the in particular dynamic additional force, thus enabling a realistic simulation of running characteristics and running situations.

In one advantageous embodiment, the test bench has a part-turn drive for simulating an ascending gradient and/or a descending gradient. On account of the part-turn drive, running characteristics in various running situations can be simulated even more realistically.

In a further advantageous embodiment, the test bench has means for vibrationally isolating the test bench from a foundation. On account of such a vibrational isolation of the test bench from the foundation, the result of the test of the drive axle is not distorted by external influences, for example by other test benches or other machines. Conversely, disturbances originating from the test bench are not transmitted to the foundation.

The means for vibrationally isolating the test bench advantageously comprise spring elements. The use of spring elements enables the test bench to be isolated easily and cost-effectively from the foundation.

BRIEF DESCRIPTION OF THE DRAWING

The invention is described and explained in more detail below on the basis of the exemplary embodiments shown in the figures, in which.

DETAILED DESCRIPTION OF PREFERRED EMBODIMENTS

Figure 1:
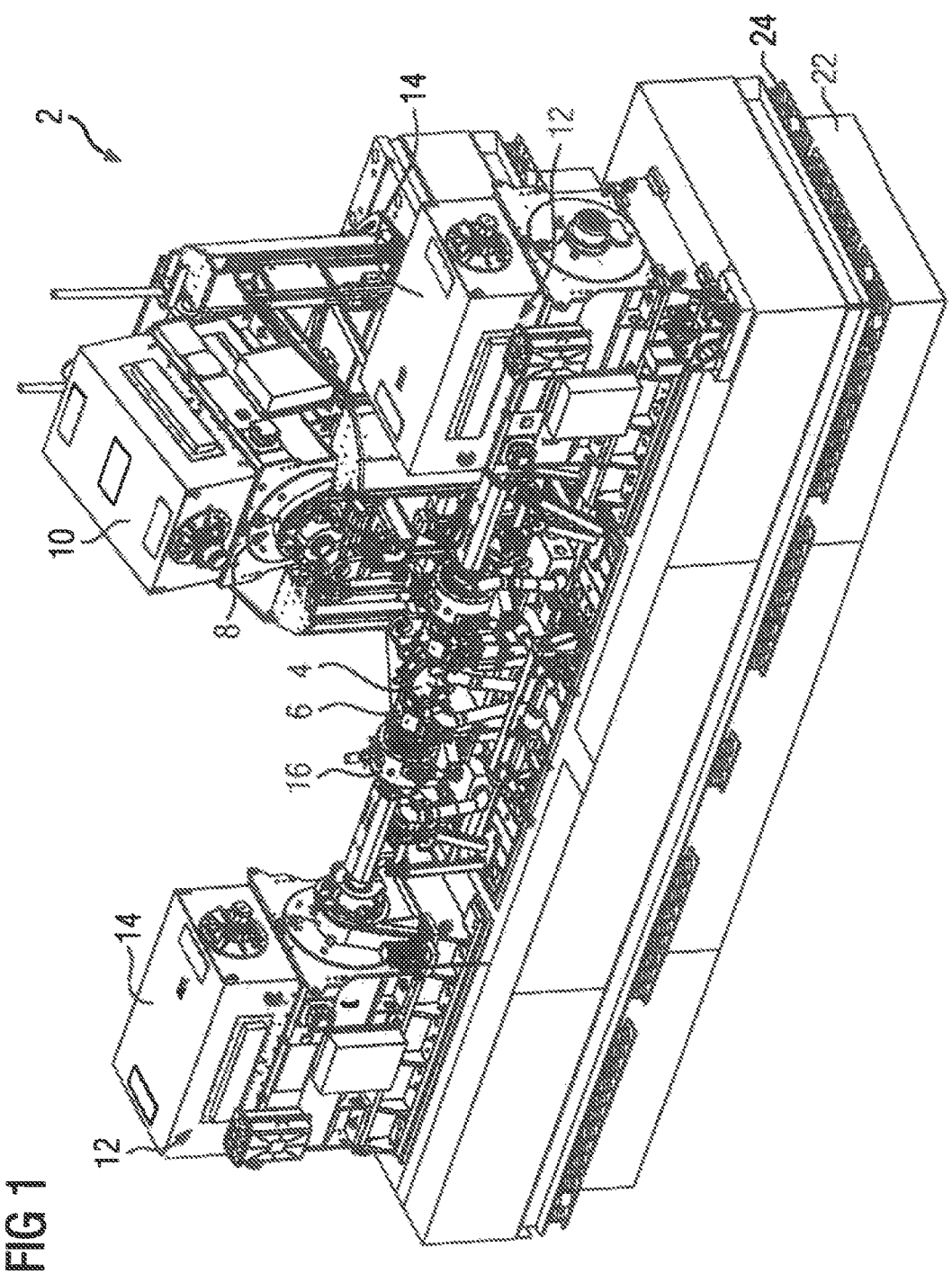
FIG. 1 shows a three-dimensional representation of a test bench for a drive axle of a motor vehicle.

The same reference characters have the same meaning in the various figures.

FIG. 1 shows a three-dimensional representation of a test bench 2 for a drive axle 4 of a motor vehicle, wherein the drive axle 4 is arranged for testing in a receptacle device 6. The drive axle 4 is received by the receptacle device 6 on original suspension points in a translationally fixed and flexibly rotatable manner. The drive axle 4 thus has the same degrees of freedom in relation to an application of force and an application of torque as in the installed state in the vehicle.

The drive axle 4 comprises an axle housing, an axle gear unit and at least one axle shaft. The test bench 2 comprises a drive device 8, which has a drive motor 10. The drive motor 10 is connected for example by way of a cardan shaft (not shown in FIG. 1 for reasons of clarity) to the axle gear unit of the drive axle 4, which is embodied as a differential gear unit. On the output side, the drive axle 4 is connected on both sides to a loading device 12, wherein the loading device 12 has a loading machine 14 on both sides. The loading machines 14 are embodied for example as electric motors. The drive axle 4 can be loaded by the loading machines 14 both statically and dynamically, in particular in an oscillating manner, as well as differently on both sides. The drive axle 4 is driven on the drive side via the drive motor 10 of the drive device 8 and braked on the output side via the loading machines 14 of the loading device 12.

The loading device 12 has bearing units 16 arranged on both sides, which are mounted in an axially flexible manner on wheel hubs of the drive axle 4. By absorbing axial forces, the bearing units 16 enable the loading of the drive axle 4 free from axial forces.

By the drive axle 4 being received and loaded in such a way, the bending torques on all parts of the axle are reproduced in an optimal manner. The test bench 2 is used to test the drive axle 4, taking real wheel loads into consideration. To minimize external influences, the test bench 2 is vibrationally isolated from a foundation 22. The vibrational isolation of the test bench 2 from the foundation is effected by means of spring elements 24.

Figure 2:
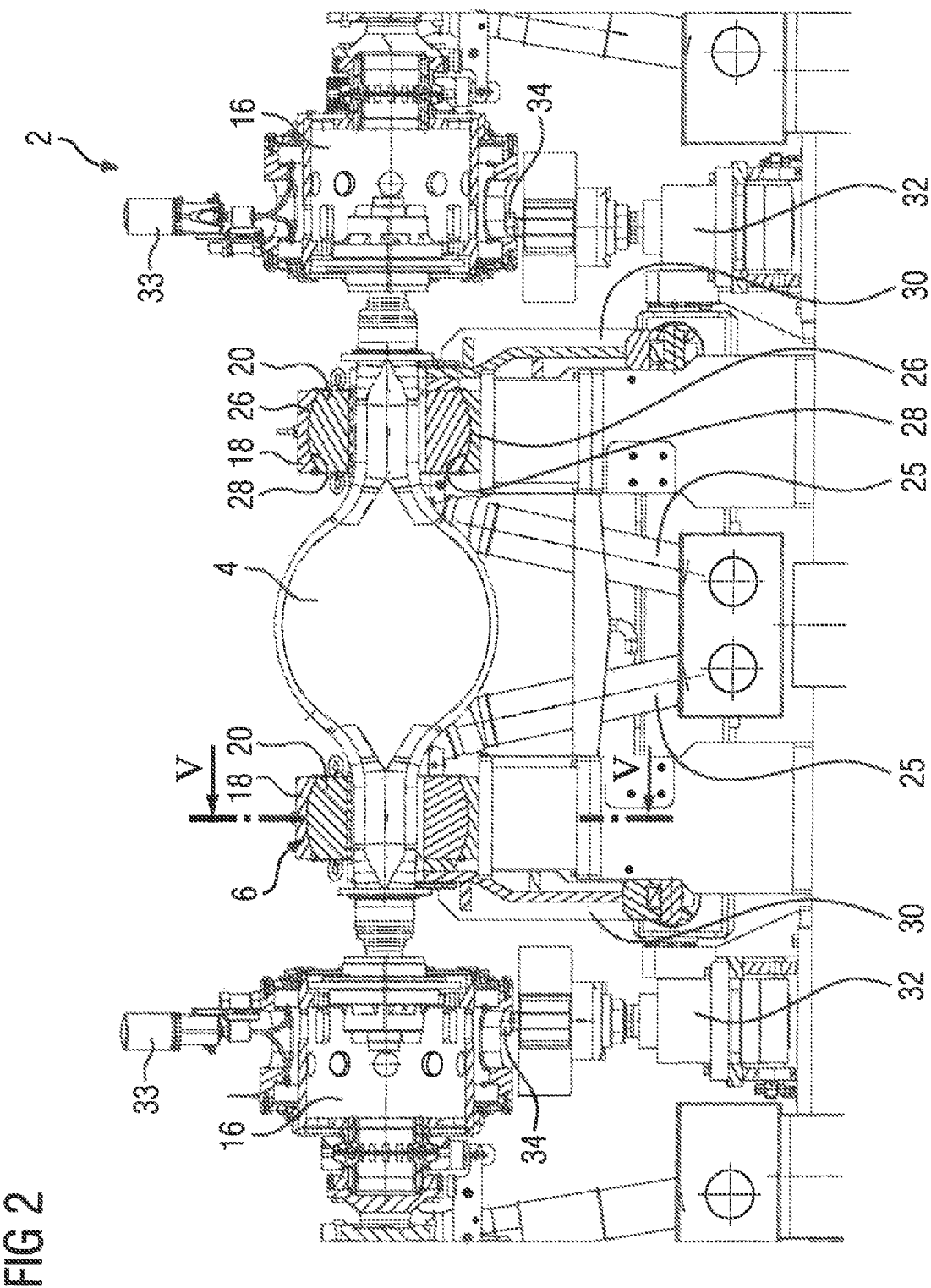
FIG. 2 shows a sectional view of a test bench for a drive axle of a motor vehicle in the region of a receptacle device.

FIG. 2 shows a sectional view of a test bench 2 for a drive axle 4 of a motor vehicle in the region of a receptacle device 6. The received drive axle 4 is cooled by way of cooling pipes 25 with a coolant, for example air. The coolant, which is guided onto the drive axle 4 by way of the cooling pipes 25, for example via nozzles, simulates in particular a headwind.

The receptacle device 6 of the drive axle 4 comprises on both sides of the axle drive unit in each case one outer unit 18 for connection to the test bench 2 and in each case one inner unit 20 enclosed in part by the outer unit 18. The inner unit 20 has a partially spherical surface 26, wherein the inner unit 20 rests on the outer unit 18 in the region of a bulge in the partially spherical surface 26. The outer unit 18 has a contact surface 28 which corresponds to the partially spherical surface 26 of the inner unit 20 in the region of a contact area between the outer unit 18 and the inner unit 20. The inner unit 20 is configured in two parts, wherein the drive axle 4 is connected at least in a form-fit manner to the inner unit 20. On account of its partially spherical surface 26, the inner unit 20 is received in the outer unit 18 in a translationally fixed and flexibly rotatable manner. Furthermore, a part-turn drive 30 for simulating an ascending gradient and/or a descending gradient is affixed on each side of the receptacle device 6 of the test bench 2.

The drive axle 4 can be loaded in a driven state by dynamic additional forces unrelated to driving and braking, which simulate for example ground unevennesses. The additional forces comprise in particular tractive forces, which occur for example during braking and acceleration of a motor vehicle, and bending torques, which occur for example when a motor vehicle travels around curves or when the motor vehicle is in a laterally tilted position. The additional forces are generated hydraulically by way of hydraulic cylinders 32, which are arranged below the bearing units 16. The bearing units 16 are lubricated by means of automatic lubrication devices 33, which press a lubricant, in particular grease, via nozzles into the bearing units as required. At least one part of the additional forces is transmitted via push rods 34. The further configuration of the test bench 2 in FIG. 2 corresponds to the configuration shown in FIG. 1.

Figure 3:
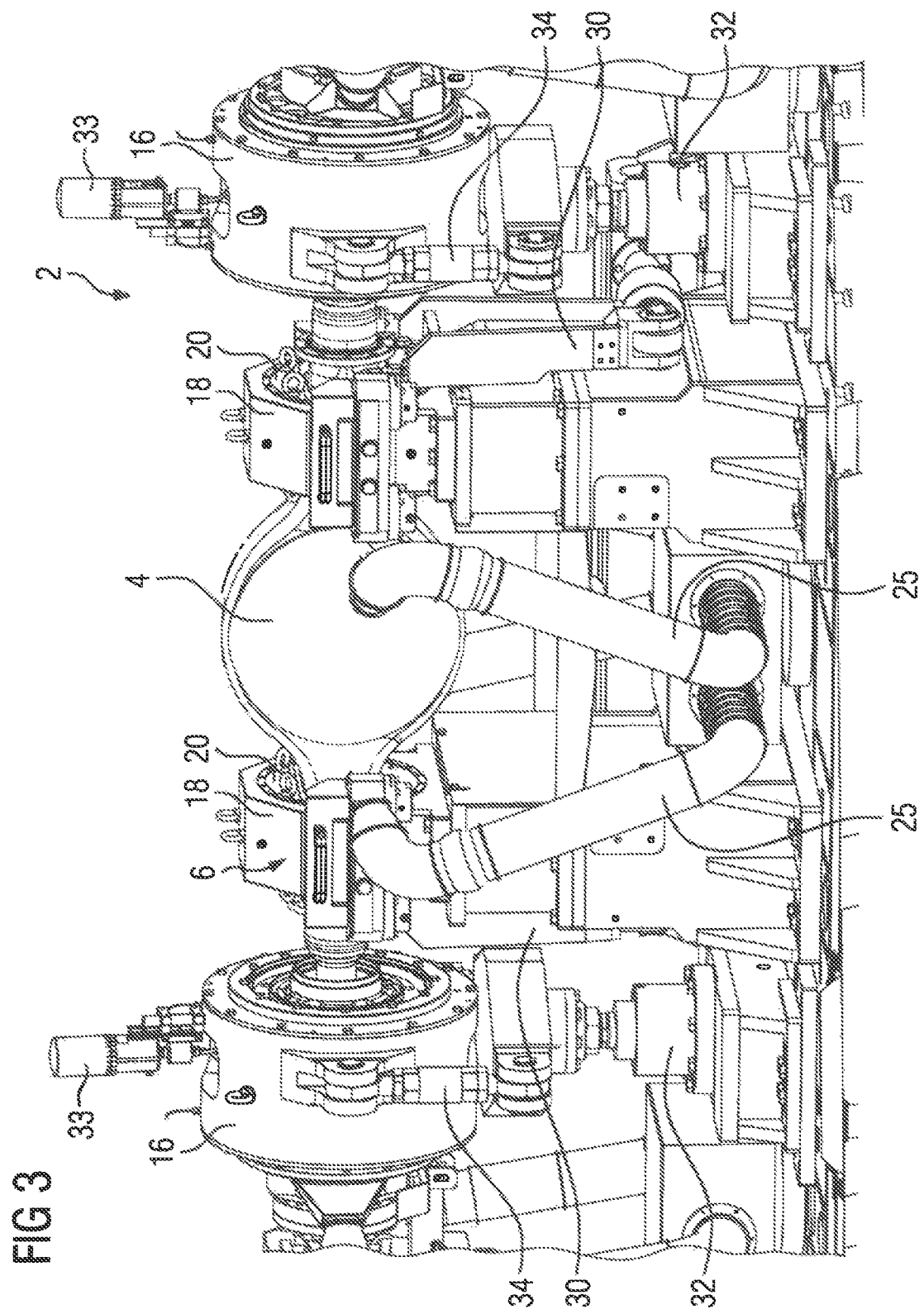
FIG. 3 shows a three-dimensional section of a test bench for a drive axle of a motor vehicle in the region of a receptacle device.

FIG. 3 shows a three-dimensional section of a test bench 2 for a drive axle 4 of a motor vehicle in the region of a receptacle device 6. The configuration of the test bench 2 in FIG. 3 corresponds to the configuration shown in FIG. 2.

Figure 4:
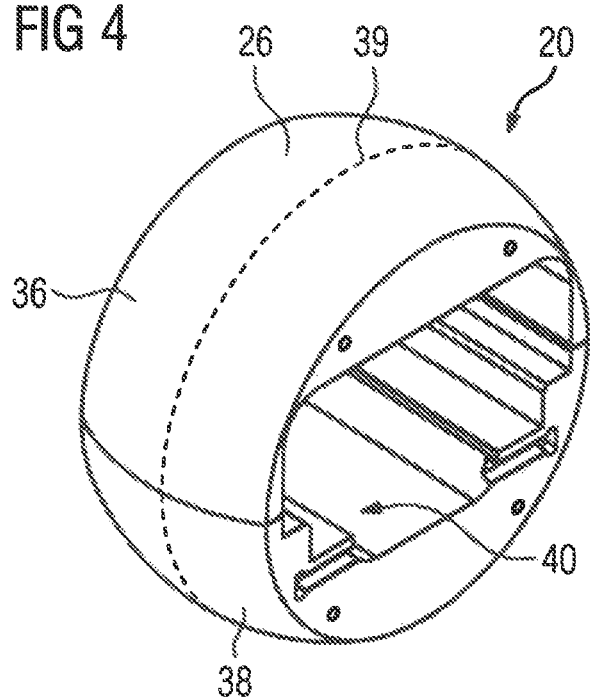
FIG. 4 shows a three-dimensional representation of an inner unit of a receptacle device.

FIG. 4 shows a three-dimensional representation of an inner unit 20 of a receptacle device 6. The inner unit 20 is manufactured from steel and has a partially spherical surface 26. The partially spherical surface 26 of the inner unit has the shape of a spherical segment symmetrical to an equator 39 and is therefore referred to as an equatorially symmetrical spherical segment. The round region of the spherical segment symmetrical to the equator 39 is provided as the contact surface for the outer unit 18 and is carburized, subsequently manganese-phosphated and coated with a lubricant varnish based on molybdenum disulfide in order to optimize the friction behavior.

Furthermore, the inner unit 20 is configured in two parts, wherein the first part 36 and the second part 38 are fixed together by means of connecting elements such as pins, screws or bolts, or alternatively connected to one another in a detachable manner. Furthermore, the inner unit 20 comprises a recess 40 for receiving the drive axle 4, wherein the drive axle 4 is fastened by a connection of the parts 36, 38 of the inner unit 20.

Figure 5:
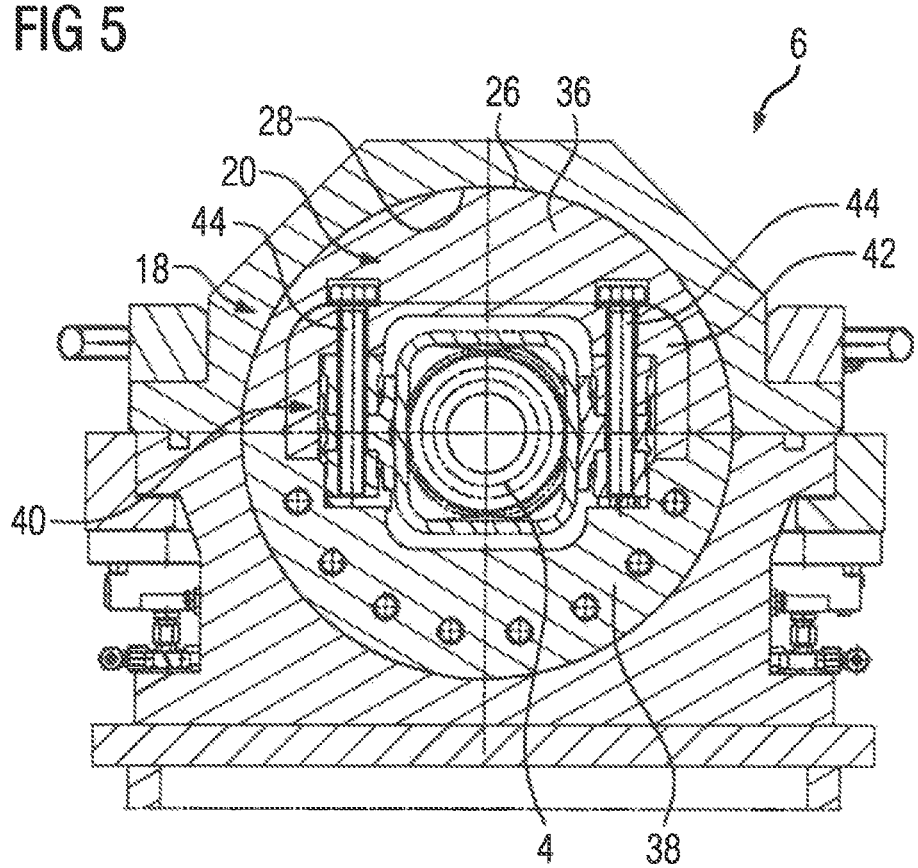
FIG. 5 shows a cross-section of the receptacle device with the drive axle.

FIG. 5 shows a cross-section of the receptacle device 6 with the drive axle 4, wherein the drive axle 4 is received via an adapter unit 42 in the recess 40 of the inner unit 20 shown in FIG. 4. The adapter unit 42 is connected to the original suspension points of the drive axle 4 by way of connecting elements 44, in particular screws or bolts. The inner unit 20, which is connected in a fixed manner to the drive axle, is received in the outer unit 18 in a translationally fixed and flexibly rotatable manner, wherein the coated, partially spherical surface 26 of the inner unit 20 is mounted movably on the corresponding contact surface 28 of the outer unit 18. The corresponding contact surface 28 of the outer unit 18 is in particular also carburized, subsequently manganese-phosphated and coated with a lubricant varnish based on molybdenum disulfide in order to optimize the friction behavior. The further configuration of the receptacle device 6 corresponds to the configuration shown in FIG. 2.

In summary, the invention relates to a receptacle device 6 for receiving a drive axle 4 of a motor vehicle for a test bench 2. In order to achieve a more realistic load distribution in comparison with the prior art, it is proposed that the receptacle device 6 has at least one outer unit 18 for connection to the test bench 2 and at least one inner unit 18 enclosed at least in part by the outer unit 18, wherein the inner unit 20 is translationally fixed relative to the outer unit 18 and is designed to be flexibly rotatable about at least one axis, and wherein the inner unit 20 has a recess 40 suitable for receiving the drive axle 4.

What is claimed is:

1. A test bench for testing a drive axle for a motor vehicle, wherein the drive axle has two opposing ends and comprises an axle housing, an axle gear and at least one axle shaft, said test bench comprising at each of the opposing ends:
   a drive device;
   a loading device; and
   a receptacle device including an outer unit fixedly connected to the test bench and an inner unit enclosed at least in part by the outer unit and fixedly connected to the axle housing, said inner unit being translationally fixed relative to the outer unit and flexibly rotatable about more than one axis relative to the outer unit, said inner unit having a recess configured to receive the axle housing.

2. The test bench of claim 1, wherein the inner unit has a partially spherical surface.

3. The test bench of claim 2, wherein the outer unit has a contact surface configured to correspond to the partially spherical surface of the inner unit at least in a region of a contact area for the inner unit.

4. The test bench of claim 2, wherein at least one of the partially spherical surface of the inner unit and the contact surface of the outer unit are coated with a coating, in particular a coating which includes molybdenum.

5. The test bench of claim 1, wherein the inner unit is configured in at least two parts.

6. The test bench of claim 1, further comprising an adapter unit configured to enable the axle housing to be received in the recess of the inner unit.

7. The test bench of claim 6, wherein the adapter unit is connected to original suspension points of the axle housing via connecting elements, in particular screws or bolts.

8. The test bench of claim 1, wherein the loading device includes a loading machine and a wheel hub bearing assembly via which the loading machine is connectable to the drive axle.

9. The test bench of claim 8, wherein the wheel hub bearing assembly comprises a bearing unit for absorbing an axial force.

10. The test bench of claim 1, wherein the loading device includes a hydraulic cylinder for loading the drive axle with an additional force, in particular a dynamic additional force.

11. The test bench of claim 1, wherein the loading device includes push rods for transmitting an additional force, in particular a dynamic additional force.

12. The test bench of claim 1, further comprising a part-turn drive for simulating an ascending gradient and/or a descending gradient.

13. The test bench of claim 1, further comprising a device configured to vibrationally isolate the test bench from a foundation.

14. The test bench of claim 13, wherein the device comprises spring elements.

15. A method for testing a drive axle for a motor vehicle on a test bench, said method comprising, at each of two opposing ends of the drive axle:
connecting an outer unit of a receptacle device of the test bench to the test bench;
enclosing at least in part an inner unit of the receptacle by the outer unit;
fixedly connecting the inner unit to the axle housing;
translationally fixing the inner unit relative to the outer unit;
arranging the inner unit for flexible rotation about more than one axis relative to the outer unit; and
placing the drive axle in a recess of the inner unit.

16. The method of claim 15, wherein the drive axle is driven on a drive side and braked on an output side, and further comprising loading the drive axle in a driven state by a dynamic additional force unrelated to driving and braking.

17. The method of claim 16, wherein the dynamic additional force is generated hydraulically.

18. The method of claim 17, further comprising measuring the hydraulically generated additional force.

19. The method of claim 16, further comprising absorbing an axial force by a bearing unit, when the drive axle is loaded.

20. The method of claim 15, wherein the dynamic additional force is generated by push rods.

21. The method of claim 15, further comprising simulating an ascending gradient and/or a descending gradient by a part-turn drive.

22. The method of claim 15, further comprising vibrationally isolating the test bench from a foundation.

* * * * *